United States Patent
Eckhardt et al.

(10) Patent No.: US 6,173,055 B1
(45) Date of Patent: Jan. 9, 2001

(54) SECURITY LATCH FOR NETWORK INTERFACE DEVICES AND PLASTIC ENCLOSURES

(75) Inventors: Peter F. Eckhardt, Gladstone; Jason A. Kay, Morristown; David S. Kerr, Morris Plains, all of NJ (US); Ronald Marchisin, Tobbyhanna; Ivan Pawlenko, Holland, both of PA (US)

(73) Assignee: Avage Inc., Basking Ridge, NJ (US)

( * ) Notice: Under 35 U.S.C. 154(b), the term of this patent shall be extended for 0 days.

(21) Appl. No.: 09/241,916

(22) Filed: Feb. 2, 1999

(51) Int. Cl.[7] .................................................... H04M 1/00

(52) U.S. Cl. .............................................................. 379/399

(58) Field of Search ................................. 379/399, 438; 439/533, 535, 509, 521, 522

(56) References Cited

U.S. PATENT DOCUMENTS 5,625,686 * 4/1997 Capper et al. ........................ 379/399
5,671,273 * 9/1997 Lanquist ............................... 379/399

* cited by examiner

*Primary Examiner*—Jack Chiang

(57) ABSTRACT

A latch for securing the cover to the housing of a network interface device including a shaft having a bayonet-type projection at its tail end rotatable to lock with one of two tabs fabricated as part of the housing, and with a stop projection at its opposite end to capture the shaft within the cover. In a preferred embodiment of the invention, the housing, the cover, the tabs and the shaft are all constructed of a substantially plastic composition, and with a controlled rotation of ±90° from the quiescent insertion of the shaft for locking and unlocking the network interface device in allowing for automated manufacture and assembly of the interface device in telephone and data equipment test accessing port.

11 Claims, 1 Drawing Sheet

SECURITY LATCH FOR NETWORK INTERFACE DEVICES AND PLASTIC ENCLOSURES

BACKGROUND OF THE INVENTION

1. Field of the Invention

This invention relates to the testing of telephone lines, in general, and to the testing of such lines as used in voice and data transmission for both personal and business users, in particular.

2. Description of the Related Art

With the advent of deregulation in the telephone industry has come the need to determine whether a problem on a line is external to a structure (and, therefore, the obligation of the telephone company to correct) or internal to the structure (and, thusly, the responsibility of the end-user to deal with) Network interface devices developed to address this concern commonly employ anywhere from 1 to 200 modular jacks as test access ports, depending upon whether the monitoring is of a line that may be present in a residence, or at a business location. Whether or not the modular jack is of an RJ 11 type carrying 2 conductors, or whether it is of an RJ 45 type carrying 8 or 9 conductors, and whether or not the network interface devices additionally incorporate such other features as surge suppression or lightning, over-current or over-voltage suppression controls, the ever increasing competition in the telephone industry requires that the costs associated with these devices be kept as low as possible. These costs include, not only the manufacturing costs of the units, but the installation costs, as well, in addition to the costs connected with their actual use in testing the problem on the line.

SUMMARY OF THE INVENTION

One area of investigation—leading to the present invention—for keeping these various costs low deals with the network interface device itself. More specifically, as presently provided, these devices include a housing having at least one telephone or data equipment test access port and a cover to be secured to the housing. Typically, the housing is provided with a threaded metal insert in its base for receiving the threads of a metal screw inserted through an opening in the cover; turning the screw in one direction thus serves to lock the cover, while turning the screw in the opposite direction releases the cover from the housing. A section in the screw thread is commonly cut away, so as to serve in capturing the screw when unlocking the cover, in preventing the screw from separating. Besides the labor cost associated with turning the screw several times when joining the pieces together, this type of manufacture is in a direction to work against the savings inherent if the manufacture and fitting were to be automated. The same can be said for the cost attendant to the manufacture of the grooved metal screw and of the threaded insert. Additionally, testing has shown that the metal security screw wears quickly in the field due to environmental conditions.

Clearly, if the costly security screw could be replaced, if the threaded insert in the base could be eliminated, and if a latch were developed which does not rust or corrode in usage, for example, significant cost savings in manufacture could follow. As will be appreciated, even the savings of pennies per unit quickly add up when one considers that with the ever expansion of the telecommunications industry into second and third-world nations—along with the need to constantly repair governmental infrastructures damaged by hurricane or other unforeseen catastrophe—, where the number of yearly installations can easily reach into the millions. This becomes even more so in view of analyses which indicate that the typical life of the metal security screw and threaded insert is only of the order of some 20 cycles of opening and closing, before the thread becomes stripped to the point where replacement is needed. Such a situation could manifest itself quickly when servicing the larger network interface devices used as Business Entrance Terminals, or as Business Entrance Protectors, in industrial complexes.

As will become clear from the following description, these problems of the prior art are addressed by the security latch of the present invention for use with network interface devices formed of a plastic enclosure. As will be seen, the network interface device of the invention continues to include a housing, a cover enclosing the housing, and an openable latch arrangement that joins the housing and cover together—with both the housing and cover of a substantially plastic composition. In accordance with the invention, however, the latch construction is also fabricated of this plastic, so that everything can be molded, and then fitted together by an automation process.

In a preferred embodiment of the invention, the latch feature is provided by incorporating a shaft having head and tail ends, inserted with the tail end first through an opening provided in the cover itself. A pair of tabs—which, like the shaft, is fabricated of plastic—is included in the housing, placed at predetermined positions with respect to the shaft so that one of the tabs will be contacted by a projection at the tail end of the shaft upon its angular rotation from an inserted, quiescent position. With the placement of the tabs being angularly offset with respect to that projection—as by 90°, for example—, only a simple rotational twisting will be seen to be needed to either secure the latch in one direction, or to free it in the other direction (as compared to the 7–8 turns of the metal screw previously required for joining with the threaded insert or release therefrom, as characterized the prior art). As with the construction of the prior art, a "stop" is provided to capture the latch in the cover in preventing its becoming free, and accomplished by a second projection at the head end of the shaft—also, simpler to fabricate than the cutting-away of threads along the metal screw as in previous manufacture. With this second projection angularly offset with respect to the first projection—again, preferably, by some 90°—, a simplified manner of providing the captive "stop" feature is provided (particularly, one in which a mere twisting rotation affords the protection much easier than a cutting away of screw threads, and in a manner to further lend itself to automated manufacture and assembly).

As will become clear from the following description, a latching shaft providing these features includes a "bayonet" finger at the tail end of the shaft, and a square or rectangular stop at the head end of the shaft. In this embodiment, a flat surface of the bayonet finger will be seen to bear against a flat surface of one or the other of a pair of tabs extending inwardly of the side walls of the housing. Rotation of the bayonet finger 90° in either direction from its inserted quiescent position provides the contact to secure the cover with the housing faster, easier and more cheaply than the prior art assemblies of turning a metal screw into a threaded insert, hoping that in doing so no stripping of the threads would follow. With the shaft having a hex-head or a KS-type head accessible through a collar molded into, and upwardly extending from, the cover, the end result will be seen to be a substantially plastic construction, with the latch unaffected by dust, rain, sleet or snow, or other harsh environmental exposures.

BRIEF DESCRIPTION OF THE DRAWINGS

These and other features of the present invention will be more clearly understood from a consideration of the following description, taken in connection with the accompanying drawings in which.

DETAILED DESCRIPTION OF THE INVENTION

Figure 1:
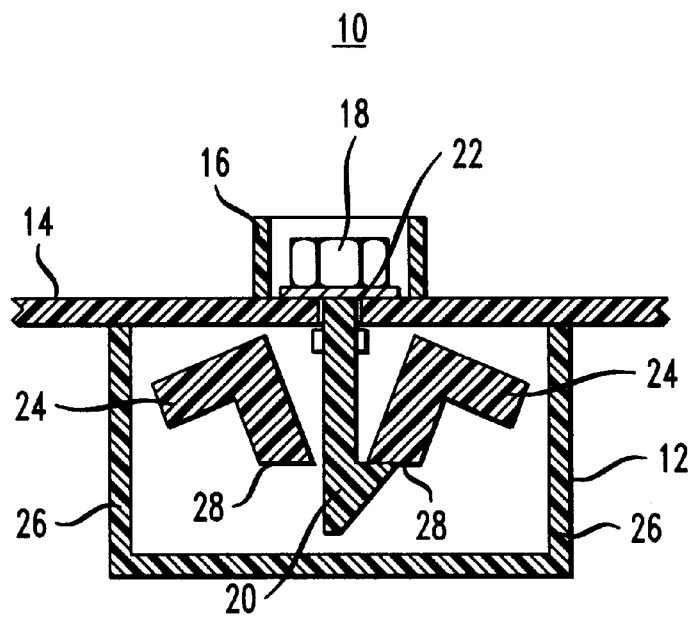
FIG. 1 is a sectional view of a greatly simplified network interface device helpful in an understanding of the invention.

Appreciating that the network interface device incorporating the invention is shown by the reference numeral 10 in FIG. 1 without illustrating any of the upwards of 200 modular jacks commonly employed therein as test access ports for the testing of telephone lines as used in voice and data transmission, the device 10 will be understood to include a housing 12 and an enclosing cover 14. A collar 16 extends upwardly from the cover 14 to receive a hex-head or a KS-type head 18 of a shaft 20 inserted through an opening 22 in the cover 14. With the housing 12 and cover 14 constructed of a plastic composition, a pair of locking tabs 24 are illustrated, extending inwardly from the side walls 26 of the housing 12, and formed during its molding. In accordance with the invention, such locking tabs 24 are fabricated with a flat surface 28 predeterminedly positioned with respect to the quiescent insertion of the shaft 20 in providing the security latch for the network interface device 10.

Figure 2:
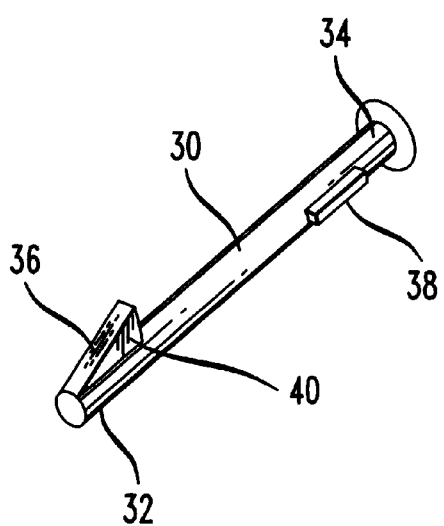
FIG. 2 is a perspective view of a plastic security latch constructed according to the invention.

As more particularly shown in FIG. 2, the shaft (shown here as 30) includes a tail end 32 and a head end 34. Adjacent to the tail end 32 is a "bayonet" finger projection 36 of triangular cross-section extending outwardly from the shaft 30, while a second projection 38 of either rectangular or square cross-section is provided adjacent the head end 34, extending outwardly from the shaft 30 at an angular offset with respect to the bayonet projection 36. Such projection 38 may extend from one side of the shaft 30 only, as shown in FIG. 2, or may extend from both sides of the shaft, as shown in FIG. 1. The angular displacement between the projections 36 and 38 may be selected as desired—although in a preferred embodiment of the invention, a 90° offset was selected. As shown, the bayonet projection 36 is provided with a substantially flat surface 40, so as to extend under the flat surface 28 of the locking tab 24, and to bear in contact against such flat surface 28 when the shaft 30 is rotated from its inserted quiescent position, in the manner shown in FIG. 1. While various degrees of angular offset between the locking tab 24 and the inserted quiescent position of the shaft may be appropriate, a 90° angular offset is preferable to effect securement by a simple 90° twist or rotation.

Installation of the latch with the cover 14 and housing 12 is then as follows: the bayonet projection 36 on the shaft 30 is aligned with the opening 22, and inserted through that opening until clear, with a subsequent rotation then being given to align the 90° offset second projection 38 so the projection 38 passes through the opening 22. The shaft 30 is then rotated away to have the projection 38 appear as a "stop" against the underside of the cover 14 in capturing the latch with the cover. From this quiescent position, a further 90° rotation of the shaft 30—either clockwise or counter-clockwise, and by a socket wrench, for example—brings the bayonet surface 40 under and against the locking tab surface 28 to secure the latch in position, joining the cover 14 and housing 12 in securement. Using the wrench to later rotate the surfaces 40 and 28 away from one another—again by a simple 90° rotation as an illustration—frees the latch in enabling the service technician to remove the cover 14 in gaining entry into the housing 12 to test any of the telephone lines connected to the access ports.

As will be recognized, with the latch of the invention made of plastic resin, the cost to manufacture it is much less than that with the metal screw and metal insert of the prior art. Installing the insert is further eliminated, as is the labor cost involved—along with the cost of threading the security screw into the insert—now unnecessary as the features of the present invention are all molded as part of the plastic fabrication. Appreciating that the design thus assembles in much less time than that which characterized the prior art, an automated manufacturing procedure is possible, resulting in an even further savings in cost—a decidedly important concern in the ever increasing area of parts manufacture competition in the telephone communications industry.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the scope of the invention.

We claim:

1. The combination comprising:
   a network interface device including a housing having at least one telephone or data equipment test access port therein;
   a cover enclosing said housing; and
   latch means joining said cover and housing together;
   with said latch means including a shaft having head and tail ends, an opening in said cover for inserting said shaft into said housing tail end first, and a pair of tabs in said housing, placed at predetermined position with respect to said shaft when inserted;
   with said shaft having a first projection adjacent its tail end for contacting one of said pair of tabs when said shaft is angularly rotated from its inserted position in securing said cover and said housing; and
   with each of said housing, said cover, said shaft and said pair of tabs being constructed of a substantially plastic composition.

2. The combination of claim 1 wherein each of said pair of tabs is angularly offset with respect to said first projection on said shaft when inserted.

3. The combination of claim 2 wherein each of said pair of tabs is offset substantially 90° with respect to said first projection.

4. The combination of claim 1 wherein said shaft also includes a second projection adjacent its head end angularly offset with respect to said first projection at its tail end.

5. The combination of claim 4 wherein said second projection is angularly offset substantially 90° with respect to said first projection.

6. The combination of claim 1 wherein said first projection and each of said pair of tabs include a flat surface positioned to bear said flat surface of said first projection beneath said flat surface of either of said pair of tabs when said shaft is rotated to secure said cover and said housing.

7. The combination of claim 6 wherein said first projection extends outwardly of said shaft in triangular cross-section.

8. The combination of claim 1 wherein said cover also includes a collar upwardly extending from said cover at said opening therein through which said shaft is inserted.

9. The combination of claim 6 wherein each of said pair of tabs is offset substantially 90° with respect to said first projection on said shaft when inserted, and wherein said shaft also includes a second projection adjacent its head end offset substantially 90° with respect to said first projection at its tail end.

10. The combination of claim 9 wherein said first projection extends outwardly of said shaft in triangular cross-section.

11. The combination of claim 10 wherein said cover also includes a collar upwardly extending from said cover at said opening therein through which said shaft is inserted.

* * * * *